United States Patent
Shimizu (10) Patent No.: US 9,992,458 B2
(45) Date of Patent: Jun. 5, 2018

(54) PROJECTOR AND METHOD OF PREVENTING IMAGE DETERIORATION THEREOF

(71) Applicant: FUJIFILM Corporation, Tokyo (JP)

(72) Inventor: Hitoshi Shimizu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 15/695,700

(22) Filed: Sep. 5, 2017

(65) Prior Publication Data

US 2017/0366789 A1     Dec. 21, 2017

Related U.S. Application Data (63) Continuation of application No. PCT/JP2016/058393, filed on Mar. 16, 2016.

(30) Foreign Application Priority Data

Mar. 31, 2015     (JP) .................................. 2015-073280

(51) Int. Cl.
*G03B 21/16* (2006.01)
*H04N 9/31* (2006.01)
(Continued)

(52) U.S. Cl.
CPC .............. *H04N 9/31* (2013.01); *G02B 7/023* (2013.01); *G02B 7/028* (2013.01); *H04N 5/74* (2013.01); *G03B 21/16* (2013.01); *H04N 9/3114* (2013.01)

(58) Field of Classification Search
CPC .... G03B 21/16; H04N 9/3144; H04N 9/3114; G02B 7/023; G02B 7/028; G02B 7/02
(Continued)

(56) References Cited

U.S. PATENT DOCUMENTS 6,467,910 B1   10/2002   Sato
2006/0017362 A1   1/2006   Uno et al.
(Continued)

FOREIGN PATENT DOCUMENTS

JP     2001-4931 A     1/2001
JP     2001-228535 A   8/2001
(Continued)

OTHER PUBLICATIONS

International Search Report (PCT/ISA/210) issued in PCT/JP2016/058393, dated Jun. 7, 2016.
(Continued)

*Primary Examiner* — Ryan Howard
(74) *Attorney, Agent, or Firm* — Birch, Stewart, Kolasch & Birch, LLP (57) ABSTRACT

A projection lens has a lens barrel holding a lens. In a case where an image forming panel is disposed to be shifted with respect to an optical axis of the projection lens, in a second part on a side to which the image forming panel is shifted with respect to the optical axis of the projection lens, there is a great increase in temperature, and in a first part on the opposite side, there is a small increase in temperature. A lens barrel heating optical section has a first mirror, condensing lenses, and a second mirror. The lens barrel heating optical section emits the redundant light, which is reflected by the color wheel, toward the first part of the lens barrel. By heating the first part through redundant light, temperature distribution in the circumferential direction becomes uniform, and deterioration in performance of the projected image is suppressed.

20 Claims, 5 Drawing Sheets

(51) Int. Cl.
*H04N 5/74* (2006.01)
*G02B 7/02* (2006.01)

(58) Field of Classification Search
USPC .............................. 353/52, 100, 84; 359/811
See application file for complete search history.

(56) References Cited

U.S. PATENT DOCUMENTS

2006/0262284 A1   11/2006  Onishi et al.
2011/0234989 A1*   9/2011  Kudo .................... G03B 21/16
                                                         353/52

FOREIGN PATENT DOCUMENTS

| JP | 2004-264570 A | 9/2004 |
| JP | 2006-47980 A | 2/2006 |
| JP | 2006-322981 A | 11/2006 |
| JP | 2009-92817 A | 4/2009 |
| JP | 2011-209393 A | 10/2011 |
| JP | 2011-209394 A | 10/2011 |
| JP | 2013-195490 A | 9/2013 |

OTHER PUBLICATIONS

Written Opinion of the International Searching Authority (PCT/ISA/237) issued in PCT/JP2016/058393, dated Jun. 7, 2016.

* cited by examiner

PROJECTOR AND METHOD OF PREVENTING IMAGE DETERIORATION THEREOF

CROSS-REFERENCE TO RELATED APPLICATIONS

This application is a Continuation of PCT International Application No. PCT/JP2016/058393 filed on Mar. 16, 2016, which claims priority under 35 U.S.C § 119(a) to Japanese Patent Application No. 2015-073280 filed on Mar. 31, 2015. Each of the above application(s) is hereby expressly incorporated by reference, in its entirety, into the present application.

BACKGROUND OF THE INVENTION

1. Field of the Invention

The present invention relates to a projector and a method of preventing image deterioration thereof. In particular, the present invention relates to a projector, in which the image forming panel is fixed in a state where the panel is shifted, and a method of preventing image deterioration thereof.

2. Description of the Related Art

Projectors give an image based on image information to light, which is emitted from a light source device, through an image forming panel (light modulation panel), and project the light onto a screen through a projection lens so as to display the image. For example, a liquid crystal display (LCD) or a digital micromirror device (DMD) is used as the image forming panel.

In recent projectors, due to improvement of various image forming panels and light sources such as LCDs and DMDs, an illuminance of the projected image has been increased as compared with the related art. An amount of heat generated by the high-intensity light source, which is used in the projector, is extremely large, and the temperatures of various components inside a casing tend to increase. In particular, in the projection lens, even after a luminance of the light source is stabilized, the temperature of each lens increases until the projection lens reaches the thermal equilibrium state. Thereby, since each lens thermally expands and the refractive index and the like thereof change, shift in focal length of the projection lens occurs immediately after the luminance of the light source is stabilized and after the projection lens reaches the thermal equilibrium state. For this reason, there is a device in which a thin planar heating element such as a film heater is wound around the outer peripheral surface of a lens barrel and electric power is supplied to the planar heating element in conjunction with activation of the projector so as to generate heat (for example, refer to JP2009-92817A). Thus, before the projector displays an image on the screen, blurriness of the image caused by change in temperature of the lens is suppressed by heating the lens barrel and increasing the temperature of the inner lens in advance. In addition, at least one of the first lens group and the second lens group is heated, thereby reducing fluctuation in focal position (for example, refer to JP2011-209394A).

SUMMARY OF THE INVENTION

In a case where the optical axis of the projection lens is perpendicular to a screen, an image, which is displayed on the image forming device, is directly projected onto the screen in an enlarged manner. However, for example, in most cases of a table arrangement type projector, the screen is disposed above the projector. In particular, there is a merit that it is difficult for the presenter to shadow the front of the screen or the space saving. Thus, there is a demand for a wide-angle type projector in which the distance between the projector and the screen to be projected is set to be short. In such a projector, the image forming panel is disposed to be greatly shifted in a direction opposite to a direction in which the screen is shifted with respect to the optical axis of the projection lens. The amount of shift of the image forming panel increases as an angle of view of the projection lens of the projector becomes wide.

In a case where the image forming panel is shifted in a certain direction and projection onto the screen is performed, rays, which are deviated in the direction in which the image forming panel is shifted from the center of the optical axis of the projection lens, pass through the lens. Therefore, the temperature increases at the position, at which the light passes, in the projection lens. Due to the increase in temperature, in the lens barrel of the projection lens, temperature distribution is generated such that the temperature increases on the side, to which the image forming panel is shifted in the direction perpendicular to the optical axis, and the temperature decreases on the opposite side. Due to the uneven temperature distribution, a position of the lens barrel or a member holding the lens is deformed, and a plurality of lenses constituting the projection lens or a part of the lenses thereof is tilted or displaced. In a case where the lenses are tilted, the optical performance of the projection lens changes from the design value. Thus, this change may deteriorate the quality of the image projected onto the screen.

In JP2009-92817A and JP2011-209394A, fluctuation in focal position is suppressed by heating the lens barrel to a uniform temperature throughout the entire outer peripheral surface of the lens barrel by using heating means such as a heater. However, only by heating the lens barrel of the projection lens to a uniform temperature in the circumferential direction, there is no consideration about the temperature difference in the direction perpendicular to the optical axis of the projection lens. Thus, the tilt and the displacement of the lens caused by partial deformation of the lens barrel are not suppressed, and the quality of the image projected onto the screen still deteriorates. Accordingly, new measures therefor have been desired.

The present invention has been made in consideration of such a situation, and its object is to provide a projector, which is capable of suppressing deterioration in quality of an image to be projected by eliminating uneven temperature distribution in a circumferential direction of a lens barrel as a direction perpendicular to an optical axis of a projection lens, and a method of preventing image deterioration of the projector.

In order to achieve the object, a projector of the present invention comprises: a projection lens that has a lens and a lens barrel holding the lens; an image forming panel; a color light separation mechanism; and a lens barrel heating optical section. The image forming panel that forms an image is disposed such that a center thereof is shifted with respect to an optical axis of the projection lens. The light source irradiates the image forming panel with light. And the image is projected onto a projection surface through the projection lens. The color light separation mechanism has three-color filters. The color filters select wavelengths of light emitted from the light source in a time-division manner, and transmit at least three-color light of red light, green light, and blue light. At least one of the color filters is a dichroic filter which reflects redundant light in a wavelength region other than a wavelength of the transmitted light. The lens barrel heating optical section irradiates a first part of the lens barrel on a side opposite to a side to which the image forming panel is shifted, with the redundant light.

Further, a projector of the present invention comprises: a projection lens that has a lens and a lens barrel holding the lens; an image forming panel; a color light separation mechanism; and a lens barrel heating optical section. The image forming panel that forms an image is disposed such that a center thereof is shifted with respect to an optical axis of the projection lens. The light source irradiates the image forming panel with light. And the image is projected onto a projection surface through the projection lens. The color light separation mechanism has three-color mirrors selecting wavelengths of light emitted from the light source in a time-division manner and reflecting at least three-color light of red light, green light, and blue light. At least one of the mirrors is a dichroic mirror which transmits redundant light in a wavelength region other than a wavelength of the reflected light. The lens barrel heating optical section irradiates a first part of the lens barrel on a side opposite to a side to which the image forming panel is shifted, with the redundant light.

It is preferable that the color light separation mechanism has a color wheel, and a normal line to a filter surface of the color wheel is set to be oblique to an optical axis of an illumination optical section. Further, it is preferable that the image forming panel is formed of a reflective image forming element or a transmissive image forming element.

It is preferable that the lens barrel heating optical section has a condensing lens which condenses the redundant light. Further, it is preferable that the lens barrel heating optical section has a light amount control mechanism that controls a light amount of the redundant light, and the light amount control mechanism is any one of a stop, a density filter, a variable density filter, and a gradation neutral density filter.

It is preferable that the projector further comprises a sensor that detects a temperature difference between the first part and a second part of the lens barrel on a side opposite to the first part with respect to the optical axis, and the light amount control mechanism decreases the temperature difference by controlling the light amount of the redundant light on the basis of a signal sent from the sensor. Further, it is preferable that the lens barrel is made of synthetic resin. It is preferable that the first part is located to be closer to the image forming panel than a position of a stop which determines an F number of the projection lens. It is preferable that in a case where a distance from the optical axis of the projection lens to the center of the image forming panel is Y, a length of the image forming panel in a direction of shift is H, and an amount of shift of the image forming panel, which is obtained by dividing the distance Y by the length H, is set as S=Y/H, the amount of shift S is in a range of 0.4<S<0.7.

In a method of preventing image deterioration of a projector of the present invention, an image forming panel is disposed such that a center thereof is shifted with respect to an optical axis of a projection lens having a lens and a lens barrel holding the lens. The image forming panel is irradiated with light from a light source. A projection surface is irradiated with the image through the projection lens by selecting wavelengths of light emitted from the light source in a time-division manner and transmitting at least three-color light of red light, green light, and blue light through a color light separation mechanism having at least one of color filters formed of a dichroic filter which reflects redundant light in a wavelength region other than a wavelength of the transmitted light. A first part of the lens barrel on a side opposite to a side, to which the image forming panel is shifted, is irradiated with the redundant light through a lens barrel heating optical section.

Further, in a method of preventing image deterioration of a projector of the present invention, an image forming panel is disposed such that a center thereof is shifted with respect to an optical axis of a projection lens having a lens and a lens barrel holding the lens. The image forming panel is irradiated with light from the light source. The image forming panel is irradiated with light by selecting wavelengths of light emitted from the light source in a time-division manner and reflecting at least three-color light of red light, green light, and blue light, through a color light separation mechanism having at least one dichroic mirror which transmits redundant light in a wavelength region other than a wavelength of the reflected light, and the image is projected onto a projection surface through the projection lens. A first part of the lens barrel on a side opposite to a side, to which the image forming panel is shifted, is irradiated with the redundant light through a lens barrel heating optical section.

It is preferable that a temperature difference between the first part and a second part of the lens barrel on a side opposite to the first part with respect to the optical axis is detected, and the temperature difference is decreased by controlling the light amount of the redundant light on the basis of the temperature difference.

According to the projector of the present invention, by controlling the temperature distribution in the direction perpendicular to the optical axis of the lens barrel holding the lens, it is possible to prevent the tilt and the displacement of the lens, deterioration in quality of the projected image is suppressed. Since a part of the lens barrel is heated by the redundant light which is not used for projection without the heater provided in the lens barrel, it is possible to control the temperature distribution without change in configuration of the lens barrel itself, and power supply for heating is also unnecessary.

DESCRIPTION OF THE PREFERRED EMBODIMENTS

First Embodiment

Figure 1:
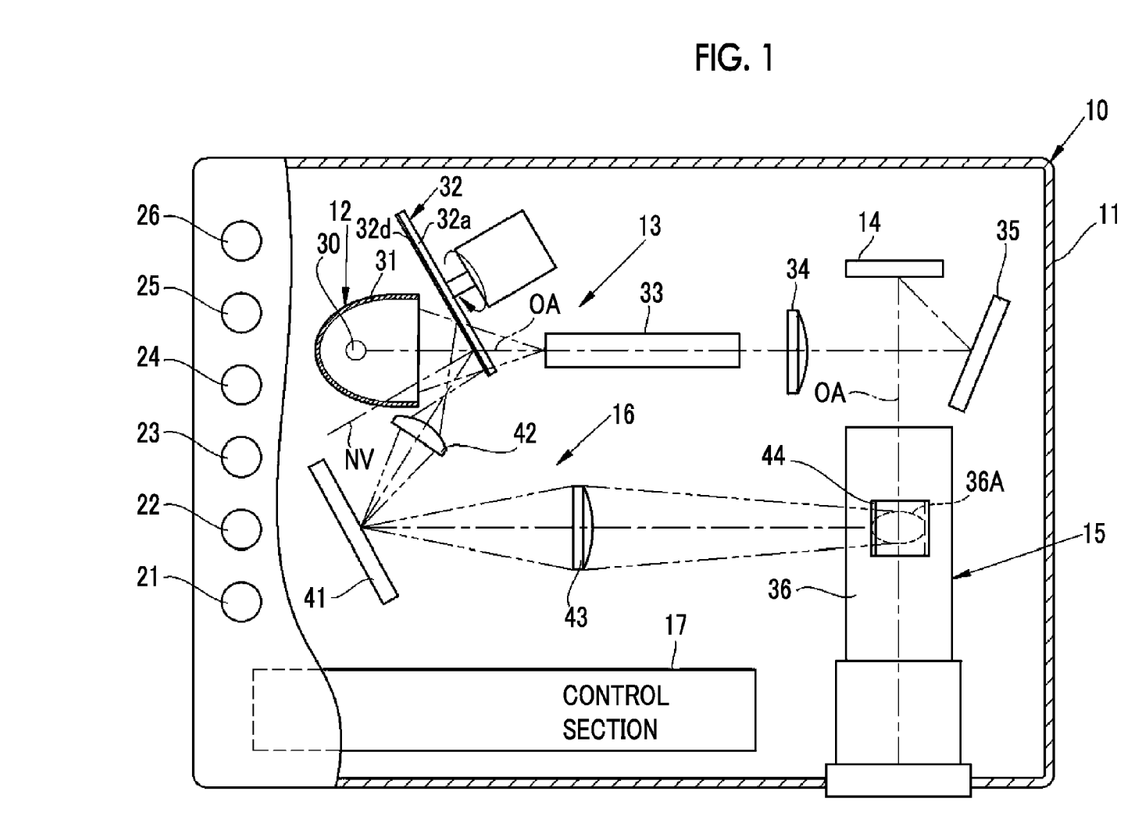
FIG. 1 is a plan view illustrating a schematic configuration of a projector of a first embodiment, where a part of a casing thereof is notched.

As shown in FIG. 1, in a projector 10 of the present embodiment, a casing 11, which has a substantially rectangular parallelepiped shape, houses a light source section 12, an illumination optical section 13, an image forming panel 14, a projection lens 15, a lens barrel heating optical section 16, and a control section 17. A zoom dial 21, a light amount adjustment dial 22, a focus dial 23, a vertical keystone adjustment dial 24, a horizontal keystone adjustment dial 25, and a screen adjustment dial 26 are provided on the upper surface of the casing 11.

The light source section 12 has a light source 30 and a reflector 31. The light source 30 is a high-intensity lamp such as a xenon lamp, a metal halide lamp, an extra-high pressure mercury lamp, or the like, and emits natural white light having no specific polarization direction. The reflector 31 condenses irradiation light, which is emitted by the light source 30, in one direction.

Figure 2:
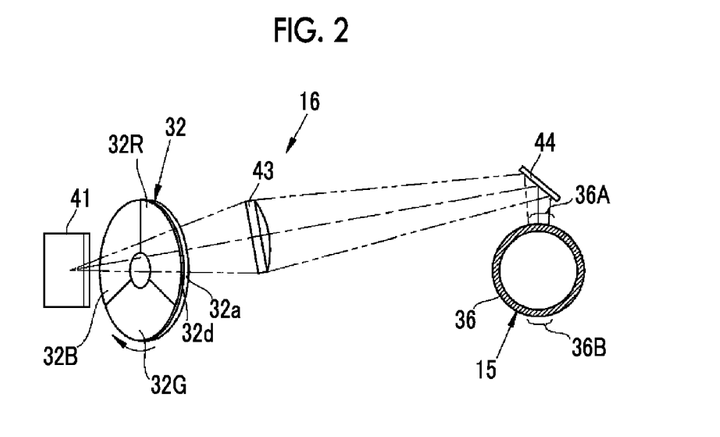
FIG. 2 is a front view illustrating a lens barrel heating optical section.

The illumination optical section 13 has a color wheel 32 as a color light separation mechanism, a rod integrator 33, a relay lens 34, and a mirror 35. The color wheel 32 selects wavelengths of color light having three colors such as red (R), green (G), and blue (B) from illumination light, which is emitted from the light source 30, and separates the illumination light in a time division manner. As shown in FIG. 2, the color wheel 32 is configured such that the respective R, G, and B filters 32R, 32G, and 32B formed of dichroic filters are disposed equidistantly in the circumferential direction on a discoid substrate 32a. The R filter 32R transmits only R light, and reflects the other G light and B light. The G filter 32G transmits only G light, and reflects the other R light and B light. The B filter 32B transmits only B light, and reflects the other R light and G light.

As shown in FIG. 1, a normal line NV to the filter surface 32d of the color wheel 32 is set to be oblique to an optical axis OA of the illumination optical section 13. The color wheel 32 rotates at a high speed, and sequentially inserts the filters 32R, 32G, and 32B into the illumination light path. Thereby, the illumination light is separated into three colors of R, G, and B in a time division manner, and is sequentially irradiated toward the image forming panel 14. In addition, light in a wavelength region other than a wavelength of the transmitted light is reflected as redundant light, which is not used for projection, to the lens barrel heating optical section 16.

The rod integrator 33 is made of, for example, glass, and has a reflecting surface formed on the inner side thereof, or guides light by using total reflection based on the critical angle of rays at the inner surface of the glass. In a case where the light separated by the color wheel 32 is incident into the rod integrator 33, the density of rays is uniformized by repeating reflection while the light is transmitted through the rod integrator 33, and the light is emitted from the rod integrator. The relay lens 34 relays the rays, which are emitted from the rod integrator 33, to the mirror 35. The mirror 35 reflects the rays toward the image forming panel 14. The image forming panel 14 uses a single panel type DMD (reflection type image forming element) that generates image light beams with three colors through one panel. Instead of the single panel type DMD, a transmission type image forming element such as a single panel type liquid crystal panel that generates image light beams with three colors through one panel may be used.

The control section 17 performs control to display images of three colors such as RGB, on the image forming panel 14 in synchronization with rotation of the color wheel 32. Further, the control section 17 also performs the following processing. For example, in a case of receiving an operation signal of the zoom dial 21, a size of the image projected onto the screen 20 is adjusted. In a case of receiving an operation signal of the light amount adjustment dial 22, a brightness of the image projected onto the screen 20 is adjusted. In a case of receiving an operation signal of the focus dial 23, a focus adjustment mechanism (not shown) of the projection lens 15 is operated to adjust the focus of the central portion of the image projected onto the screen 20. In a case of receiving an operation signal of the vertical keystone adjustment dial 24, the projection lens 15 is rotated about a horizontal axis perpendicular to the optical axis OA, through a first motor of an attitude adjustment device (not shown), and thereby the tilt of the projection lens 15 in the vertical direction is adjusted. In a case of receiving an operation signal of the horizontal keystone adjustment dial 25, the projection lens 15 is rotated about the vertical axis orthogonal to the optical axis OA, through a second motor of the posture adjustment device, and thereby the tilt of the projection lens 15 in the horizontal direction is adjusted. In a case of receiving an operation signal of the screen adjustment dial 26, a display size and a shape of the image formed on the image forming surface of the image forming panel 14 are changed. For example, the display size and shape are changed such that the rectangular image is not displayed as a trapezoidal image in accordance with the tilt angle of the projection lens 15.

Figure 3:
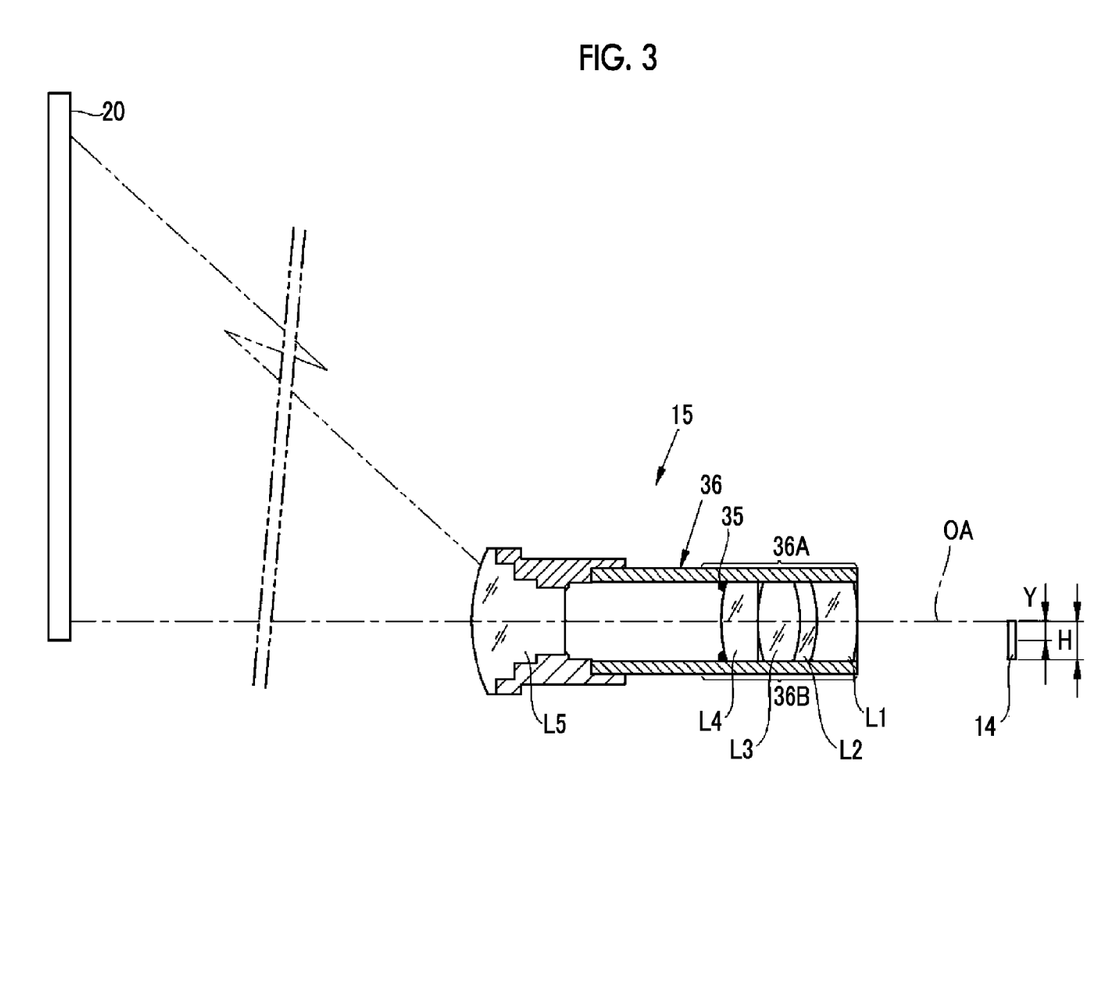
FIG. 3 is a partial cross-sectional side view illustrating an amount of shift of the image forming panel and a positional relationship of a projection lens and a screen.

As shown in FIG. 3, the image is projected upward onto the screen 20 with respect to an optical axis OA of the projection lens 15. The center of the image forming panel 14 is fixed in a state where the center is shifted downward in a direction perpendicular to the optical axis OA, with respect to the optical axis OA of the projection lens 15, that is, in a direction opposite to the direction in which the central position of the projected image (projection surface of the screen 20) is deviated with respect to the optical axis OA of the projection lens 15.

Assuming that an amount of shift (distance) from the optical axis OA of the projection lens 15 to the image forming panel center is Y and a length of the image forming panel 14 in the direction of shift is H, an amount of shift S (shift rate) of the image forming panel 14 is defined by the following expression: $S=Y/H$. That is, in a case where $S=0.5$, as shown in FIG. 3, the end face of the image forming panel 14 coincides with the optical axis OA of the projection lens 15. Further, in a case where $S>0.5$ (S is larger than 0.5), the end portion of the image forming panel 14 is shifted in a direction of separation from the optical axis OA of the projection lens 15. In a case where $S=0$, the center of the image forming panel 14 coincides with the optical axis OA of the projection lens 15, and thus the arrangement is similar to that of the conventional long distance projection type.

It is preferable that the amount of shift S of the image forming panel 14 is greater than 0.4 and less than 0.7. In a case where the amount of shift S is greater than 0.4, the effect of the temperature distribution in the direction perpendicular to the optical axis of the projection lens 15 becomes ignorable as compared with the case where the amount is equal to or less than 0.4. On the other hand, in a case where the amount of shift S is less than 0.7, the amount of shift S of the image forming panel 14 does not become extremely larger than that in the case where the amount is equal to or greater than 0.7. Thus, an increase in size of the lens system is suppressed, thereby preventing deterioration of manufacturing suitability. Therefore, by setting the amount of shift S of the image forming panel 14 within the above range, it is possible to provide a product having high performance while reducing the effect of the temperature distribution in the direction perpendicular to the projection lens 15. It is more preferable that the amount of shift S of the image forming panel 14 is greater than 0.45 and less than 0.6.

The projection lens 15 comprises: first to fifth lenses L1 to L5, a lens barrel 36, an aperture stop 37 arranged in order from the image forming panel 14. The first lens L1 has convex surfaces on both sides, and the second lens L2 has a concave surface on a screen 20 side and has a convex surface on a side of the image forming panel 14. The third lens L3 has convex surfaces on both sides, and the fourth lens L4 has a convex surface on the screen 20 side and has a planar surface on the side of the image forming panel 14. The fifth lens L5 has an aspheric surface convex on the screen 20 side and has a planar surface on the side of the image forming panel 14.

The lens barrel 36 is formed of synthetic resin such as polycarbonate (PC). It should be noted that a part or the whole of the lens barrel 36 may be made of metal.

The aperture stop 37, which has a circular shape and has an F number, is provided on the incident surface side of the fourth lens L4, and the position of the aperture stop 37 is the stop position. The light, which is incident into the projection lens 15, passes mostly through the lower side of the optical axis OA of the projection lens 15. Then, the passage path of the light is reversed at the position of the stop, and the light passes mostly through the upper side of the projection lens 15, and is projected onto the screen 20.

Since the image forming panel 14 is disposed to be shifted downward, the light passes mostly through the lower side with respect to the optical axis OA of the projection lens 15, that is, in a direction in which the image forming panel 14 within the projection lens 15 is shifted, to the position of the stop within the projection lens 15. Accordingly, the projection lens 15 on the side, to which the image forming panel 14 is shifted, is heated by passage of light, and temperature distribution occurs in the projection lens 15 in a direction perpendicular to the direction of passage of light. In the lens barrel 36, there is a great increase in temperature in a second part 36B (refer to FIG. 3) on the side to which the image forming panel 14 is shifted with respect to the optical axis OA of the projection lens 15. Further, there is a small increase in temperature in a first part 36A (refer to FIG. 3) on a side opposite to the side to which the image forming panel 14 is shifted with respect to the optical axis OA of the projection lens 15.

In a case where a temperature difference thereof is large, the lens barrel 36, which holds the first to fifth lenses L1 to L5, is also deformed by heating on only a part thereof. Due to the deformation, the first to fifth lenses L1 to L5 are tilted, and the quality of the formed image deteriorates. Further, the rotational symmetry of the first to fifth lenses L1 to L5 is destroyed by the tilt of the first to fifth lenses L1 to L5. Therefore, deterioration in resolving power of the entire projected image occurs. Furthermore, deviation in focus position in the diagonal direction due to occurrence of the field curvature and the like occurs. This leads to deterioration in performance of the entire projected image.

Therefore, the lens barrel heating optical section 16 irradiates the first part 36A of the lens barrel 36, in which the increase in temperature is small, with the redundant light, which is not used for projection, among the irradiation light from the light source 30. It is possible to increase the temperature of the first part 36A due to irradiation of the redundant light. Thereby, the temperature difference between the first part 36A and the second part 36B is set within a certain range, and thus the lens barrel 36 is prevented from being partially deformed. As a result, deterioration of the performance of the entire projected image is suppressed.

A lens barrel heating optical section 16 has a first mirror 41, condensing lenses 42 and 43, and a second mirror 44. The first mirror 41 emits the redundant light, which is reflected by the color wheel 32, toward the first part 36A of the lens barrel 36. The condensing lenses 42 and 43 condense the redundant light, which is emitted from the color wheel 32, into a size corresponding to the first part 36A. The second mirror 44 reflects the redundant light from the first mirror 41, and irradiates the entire surface of the first part 36A with the redundant light.

The control section 17 sequentially displays images with three colors such as R, G, and B on the image forming surface of the image forming panel 14, and rotates the color wheel 32 in accordance with the images with the three colors displayed on the image forming panel 14. The light, which is emitted from the light source section 12, is time-divided into the respective colors by the color wheel 32, and irradiates the image forming panel 14 through the rod integrator 33 and the relay lens 34. The image light, which is subjected to time division by the color wheel 32 and to which image information is added by the image forming panel 14, is projected by the projection lens 15, and thereby a full-color image is displayed on a screen 20 or the like.

The barrel heating optical section 16 irradiates the first part 36A of the lens barrel 36 with the redundant light which is reflected by the color wheel 32. Thereby, the temperature of the first part 36A is increased by the irradiation of the redundant light, and unevenness in temperature distribution between the first part 36A and the second part 36B is eliminated. Thereby, deterioration in image quality caused by thermal deformation of only a part of the lens barrel 36 is suppressed. In such a manner, in the present invention, the method of preventing image deterioration is performed.

Second Embodiment

Figure 4:
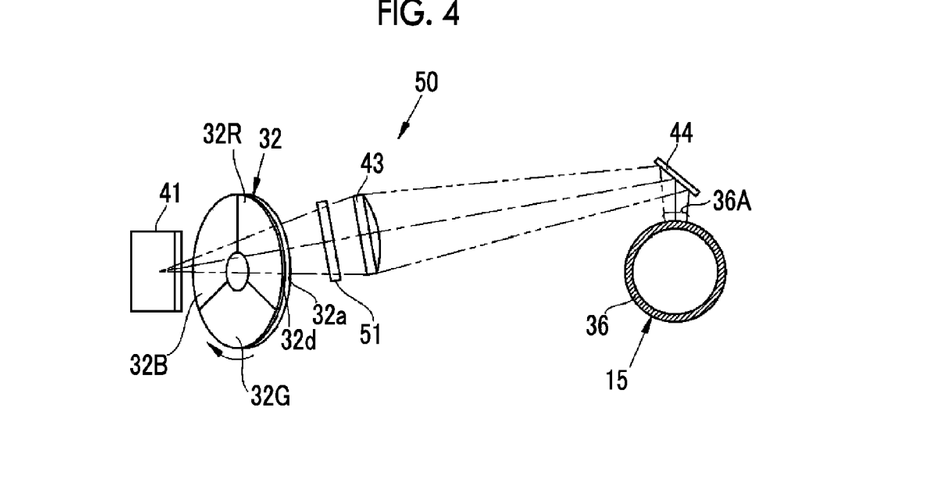
FIG. 4 is a front view illustrating a lens barrel heating optical section of a second embodiment.

In a case where the amount of heating of the first part 36A caused by irradiation of the redundant light is greater than an amount of the increase in temperature of the second part 36B and thus both are not balanced, as in the second embodiment shown in FIG. 4, a light amount control mechanism 51, which controls the light amount of redundant light, is provided in the lens barrel heating optical section 50. In the following embodiments, the same constituent members as those of the first embodiment are denoted by the same reference numerals and signs, and description of the same constituent members will be omitted. As the light amount control mechanism 51, a stop, a density filter, a variable density filter, a gradation neutral density filter (refer to as ND filter also), or the like is used. In this case, an optimum amount of control for the light amount is calculated in advance by experiments and the like, and the light amount control mechanism 51, which is able to obtain the amount of control for the light amount, is used. Instead of or in addition to providing the light amount control mechanism 51, at least one or two of the color filters may be configured to reflect the redundant light in a wavelength region other than the wavelength of the transmitted light. In this case, the entire light is prevented from being reflected as redundant light, and it is possible to reduce the amount of reflected light.

Third Embodiment

In the second embodiment, as shown in FIG. 4, the fixed light amount control mechanism 51 is provided on the basis of the predetermined control value for the light amount. However, in a third embodiment shown in FIG. 5, the lens barrel heating optical section 53 having a variable light amount control mechanism 54 is used. In the third embodiment, the temperature distribution of the lens barrel 36 in the direction perpendicular to the optical axis OA is detected using the first sensor 55 and the second sensor 56. The first sensor 55 measures the temperature of the lens barrel 36 of the projection lens 15 on the side opposite to the side to which the image forming panel 14 is shifted, and is mounted on the upper inner wall of the first part 36A of the lens barrel 36, for example. The second sensor 56 measures the temperature of the second part 36B of the lens barrel 36 on the side to which the image forming panel 14 is shifted, and is mounted on the lower inner wall of the lens barrel 36, for example.

Figure 5:
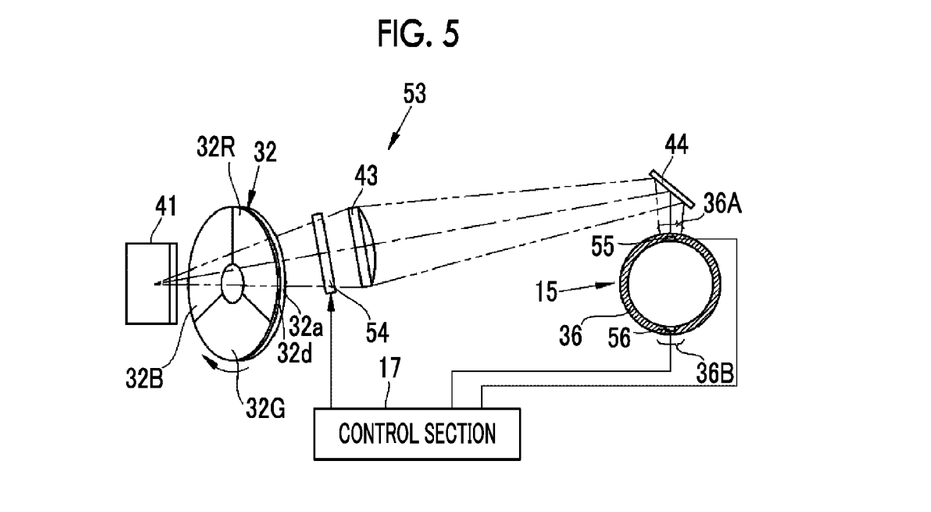
FIG. 5 is a front view illustrating a lens barrel heating optical section of a third embodiment.

By changing the aperture diameter of the light amount control mechanism 54 is changed by the temperature difference of the lens barrel 36 measured by the first sensor 55 and the second sensor 56, the amount of control for the light amount is changed. Specifically, the aperture diameter is changed such that the difference between the measurement result of the temperature of the lens barrel 36, which is measured by the first sensor 55, and the measurement result of the temperature of the lens barrel 36, which is measured by the second sensor 56, is equal to or less than a predetermined value. Here, the "predetermined value" is a value within a range that exerts the effect of the present invention, and is a temperature difference within a range in which deterioration in quality of the formed image can be suppressed by maintaining the predetermined value so as to prevent the lenses L1 to L5 from being tilted. The predetermined value is preferably 50° C. or less, and is more preferably 30° C. or less.

By changing the aperture diameter of the light amount control mechanism 54 in accordance with the temperature difference, the temperature distribution of the lens barrel 36 in the direction perpendicular to the optical axis OA becomes more uniform. Thereby, deterioration in image quality caused by thermal deformation of only a part of the lens barrel 36 is further suppressed.

The light amount control mechanism 54 may control the light amount of the redundant light by using either one of the variable density filter or the gradation ND filter instead of the stop. Further, instead of controlling the light amount by changing the aperture diameter on the basis of the temperature difference, by changing the time of irradiation of the redundant light with which the first part 36A is irradiated by opening and closing the stop, unevenness in temperature distribution in the direction perpendicular to the optical axis OA may be eliminated.

Fourth Embodiment

Figure 6:
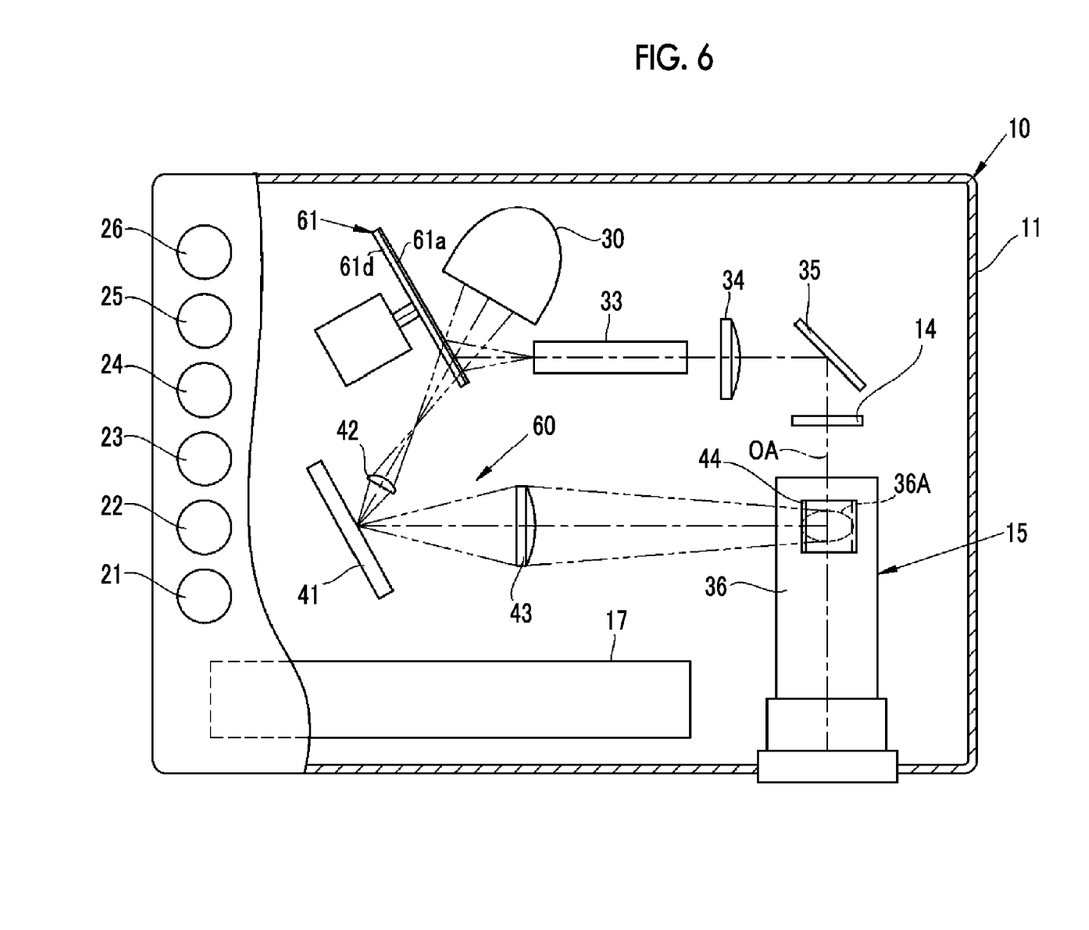
FIG. 6 is a plan view illustrating a schematic configuration of a projector of a fourth embodiment, where transmitted light is used as redundant light.

In the lens barrel heating optical sections 16, 50, and 53 of the first to third embodiments, the light reflected by the filter surface 32d of each of the color filters 32R, 32G, and 32B is used as the redundant light. On the other hand, in a lens barrel heating optical section 60 of the fourth embodiment shown in FIG. 6, transmitted light is used as the redundant light, instead of the reflected light. Therefore, a color wheel 61 having a dichroic mirror, which transmits redundant light in a wavelength region other than a wavelength of the reflected light, is used on the surface of a substrate 61a. Then, the respective color light beams of R, G, and B are reflected by the filter surface 61d, and the light beams are guided to the image forming panel 14. In addition, the light, which is transmitted through each of the R, G, and B filters, is guided as the redundant light to the first part 36A of the lens barrel 36 through the lens barrel heating optical section 60. The lens barrel heating optical section 60 includes, for example, the mirrors 41 and 44 and the condensing lenses 42 and 43. The image forming panel 14 uses a transmissive image forming element such as a single panel type transmissive color liquid crystal panel which generates image light beams with three colors through one panel. However, as in the first embodiment, the image forming panel 14 may use a reflective image forming device such as a DMD. As in the second to third embodiments, the redundant light amount may be reduced by using the light amount control mechanisms 51 and 54. Furthermore, instead of or in addition to providing the light amount control mechanism 51 or 54, at least one or two of the color filters may be configured to transmit redundant light in a wavelength region other than a wavelength of the reflected light. In this case, the entire light is prevented from being transmitted as redundant light, and it is possible to reduce the redundant light corresponding to the amount of transmitted light.

In the above-mentioned embodiments, the lens barrel heating optical sections 16, 50, 53, and 60 include the mirrors 41 and 44 and the condensing lenses 42 and 43. However, instead of this configuration, by using the light guide formed of the optical fiber, the first part 36A may be irradiated with redundant light. In this case, the light guide can be disposed in a vacant room of the existing projector. Thus, the arrangement space of the lens barrel heating optical section is smaller than that in the case of using mirrors 41 and 44 and condensing lenses 42 and 43, and the projector 10 can be assembled to be compact. In addition, due to flexibility of the light guide, the lens barrel heating optical section can be easily assembled.

In the above-mentioned embodiments, the projector 10 has described in a state where it is placed on a table, but may be used to be suspended from the ceiling or the like. In this case, the temperature distribution of the lens barrel 36 is opposite to that of the table disposition type. Accordingly, the parts to be heated by the lens barrel heating optical sections 16, 50, 53, and 60 are vertically reversed. Although an example in which an image is projected onto the screen 20 has been described, the projection surface is not limited to the screen 20, and a projector, which performs projection onto various projection surfaces, may be used.

In the above-mentioned embodiments, a xenon lamp or a halogen lamp, which emits white light, is used as the light source 30, but the present invention is not limited to this, and an LED light source device, which sequentially emits three colors such as RGB, may be used.

EXPLANATION OF REFERENCES

10: projector
12: light source section
13: illumination optical section
14: image forming panel
15: projection lens
16, 50, 53, 60: lens barrel heating optical section
20: screen
30: light source
32, 61: color wheel
36: lens barrel
36A: first part
36B: second part
37: aperture stop
41: first mirror
42, 43: condensing lens
44: second mirror 51, 54: light amount control mechanism
55: first sensor
56: second sensor

What is claimed is:

1. A projector comprising:
    a projection lens that has a lens and a lens barrel holding the lens;
    an image forming panel that forms an image, and that is disposed such that a center thereof is shifted with respect to an optical axis of the projection lens;
    a light source that irradiates the image forming panel with light and the image is projected onto a projection surface through the projection lens;
    a color light separation mechanism that has three-color filters selecting wavelengths of light emitted from the light source in a time-division manner and transmitting at least three-color light of red light, green light, and blue light, where at least one of the color filters is a dichroic filter which reflects redundant light in a wavelength region other than a wavelength of the transmitted light; and
    a lens barrel heating optical section that irradiates a first part of the lens barrel on a side opposite to a side to which the image forming panel is shifted, with the redundant light.

2. The projector according to claim 1, wherein the color light separation mechanism has a color wheel, and a normal line to a filter surface of the color wheel is set to be oblique to an optical axis of an illumination optical section.

3. The projector according to claim 1, wherein the image forming panel is formed of a reflective image forming element.

4. The projector according to claim 1, wherein the image forming panel is formed of a transmissive image forming element.

5. The projector according to claim 1, wherein the lens barrel heating optical section has a condensing lens which condenses the redundant light.

6. The projector according to claim 1,
    wherein the lens barrel heating optical section has a light amount control mechanism that controls a light amount of the redundant light, and
    wherein the light amount control mechanism is any one of a stop, a density filter, a variable density filter, and a gradation neutral density filter.

7. The projector according to claim 6, further comprising a sensor that detects a temperature difference between the first part and a second part of the lens barrel on a side opposite to the first part with respect to the optical axis, wherein the light amount control mechanism decreases the temperature difference by controlling the light amount of the redundant light on the basis of a signal sent from the sensor.

8. The projector according to claim 1, wherein the lens barrel is made of synthetic resin.

9. The projector according to claim 1, wherein the first part is located to be closer to the image forming panel than a position of a stop which determines an F number of the projection lens.

10. The projector according to claim 1, wherein in a case where a distance from the optical axis of the projection lens to the center of the image forming panel is Y, a length of the image forming panel in a direction of shift is H, and an amount of shift of the image forming panel, which is obtained by dividing the distance Y by the length H, is set as S=Y/H, the amount of shift S is in a range of $0.4<S<0.7$.

11. A method of preventing image deterioration of a projector, using the projector according to claim 1 in which the image forming panel is disposed such that a center thereof is shifted with respect to an optical axis of the projection lens having a lens and a lens barrel holding the lens, the image forming panel is irradiated with light from the light source and an image of the image forming panel is projected onto a projection surface through the projection lens, the method comprising:
    irradiating the projection surface with the image through the projection lens by selecting wavelengths of light emitted from the light source in a time-division manner and transmitting at least three-color light of red light, green light, and blue light through a color light separation mechanism having at least one of color filters formed of a dichroic filter which reflects redundant light in a wavelength region other than a wavelength of the transmitted light; and
    irradiating a first part of the lens barrel on a side opposite to a side to which the image forming panel is shifted, with the redundant light through a lens barrel heating optical section.

12. The method of preventing image deterioration of the projector according to claim 11, further comprising detecting a temperature difference between the first part and a second part of the lens barrel on a side opposite to the first part with respect to the optical axis, and decreasing the temperature difference by controlling the light amount of the redundant light on the basis of the temperature difference.

13. A projector comprising:
    a projection lens that has a lens and a lens barrel holding the lens;
    an image forming panel that forms an image, and that is disposed such that a center thereof is shifted with respect to an optical axis of the projection lens;
    a light source that irradiates the image forming panel with light and the image is projected onto a projection surface through the projection lens;
    a color light separation mechanism that has three-color mirrors selecting wavelengths of light emitted from the light source in a time-division manner and reflecting at least three-color light of red light, green light, and blue light, where at least one of the mirrors is a dichroic mirror which transmits redundant light in a wavelength region other than a wavelength of the reflected light; and
    a lens barrel heating optical section that irradiates a first part of the lens barrel on a side opposite to a side to which the image forming panel is shifted, with the redundant light.

14. The projector according to claim 13, wherein the color light separation mechanism has a color wheel, and a normal line to a filter surface of the color wheel is set to be oblique to an optical axis of an illumination optical section.

15. The projector according to claim 13, wherein the image forming panel is formed of a reflective image forming element.

16. The projector according to claim 13, wherein the image forming panel is formed of a transmissive image forming element.

17. The projector according to claim 13, wherein the lens barrel heating optical section has a condensing lens which condenses the redundant light.

18. The projector according to claim 13,
    wherein the lens barrel heating optical section has a light amount control mechanism that controls a light amount of the redundant light, and wherein the light amount control mechanism is any one of a stop, a density filter, a variable density filter, and a gradation neutral density filter.

19. A method of preventing image deterioration of a projector, using the projector according to claim 13 in which the image forming panel is disposed such that a center thereof is shifted with respect to an optical axis of the projection lens having a lens and a lens barrel holding the lens, the image forming panel is irradiated with light from the light source and the image of the image forming panel is projected onto a projection surface through the projection lens, the method comprising:

irradiating the image forming panel with light by selecting wavelengths of light emitted from the light source in a time-division manner and reflecting at least three-color light of red light, green light, and blue light, through a color light separation mechanism having at least one dichroic mirror which transmits redundant light in a wavelength region other than a wavelength of the reflected light, and projecting the image onto the projection surface through the projection lens; and irradiating a first part of the lens barrel on a side opposite to a side to which the image forming panel is shifted, with the redundant light through a lens barrel heating optical section.

20. The method of preventing image deterioration of the projector according to claim 19, further comprising detecting a temperature difference between the first part and a second part of the lens barrel on a side opposite to the first part with respect to the optical axis, and decreasing the temperature difference by controlling the light amount of the redundant light on the basis of the temperature difference.

* * * * *